Patented Apr. 1, 1930

1,752,557

UNITED STATES PATENT OFFICE

LEON J. D. HEALY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

CEMENT AND PROCESS OF MAKING SAME

No Drawing.   Application filed February 13, 1925. Serial No. 8,936.

My invention relates to a new form of cement and its method of manufacture, and more particularly to a cement of the type used for temporarily securing sheets of material in a predetermined relation upon a common backing sheet. Cement of this character is used by artists, engravers, ad writers, printers, designers, editors, and others in arranging designs or printed matter upon make-up sheets or back grounds and it is obvious the cement must be of a character which will permit removal and rearrangement of the various sheets carrying the printed matter or parts of the design without damage to the sheets or the backing on which they are placed, without losing its adhesive properties. The cements now in use for this purpose have a tendency to stain and otherwise damage the surfaces to which they are applied and for this reason the prior cements have been unsatisfactory where it is desired to use works of art, such as water colors, oil paintings, or etchings, as the basis upon which to arrange advertising or other printed matter in the production of electrotypes or other printing surfaces.

It is among the objects of my invention to provide a cement of the character described which shall not stain or otherwise damage the surface to which it is applied including works of art and the like, and which will retain its tacky character indefinitely, permitting easy removal and rearrangement of the matter applied to the foundation sheet.

I have found that a cement formed of properly heat-treated crude rubber dissolved in any of the well known rubber solvents forms a satisfactory cement for the above purpose. While not necessary in accomplishing the desired result I prefer to add a small amount of resin to the rubber solution for reasons later pointed out. Any type of crude rubber and any of the well known rubber solvents not inherently of a character which would produce a stain may be used but I prefer to use as the rubber constituent the finest quality of dried pale crepe and an oil distillate such as 70° Baumé gasoline as the solvent. When a resin is added I prefer to use colophony. Naming for the purposes of illustration the preferred materials, my method of procedure is as follows:

First quality pale crepe is given a heat treatment to partially break down or degradate the rubber, that is, change it from a higher state of polymerization to a lower, the result being an increase in plasticity. This heat treatment, which I believe is entirely new in cement work, consists in subjecting the crepe to a steam pressure of from 60 to 90 pounds per square inch at a temperature of substantially 330 degrees Fahrenheit for a period of about 30 minutes. A high pressure steam chamber such as a conventional devulcanizer is used for this purpose. It is to be noted that the rubber is used directly in making the cement without any mechanical masticating in its preparation. I then dissolve from 8 to 20% of the heat-treated crepe in from 70 to 90% of an oil distillate such as 70° Baumé gasoline. To this solution is then added from .2 to 3% colophony or other resin. The mixture is then churned or agitated until a smooth consistency is secured. While as above pointed out the exact proportions of material may be varied over substantial limits, the proportions which I find preferable are as follows:

|  | Per cent |
|---|---|
| Heat-treated in the manner above crepe | 12 |
| 70° Baumé gasoline | 87.5 |
| Colophony | .5 |

The degradation of the crude rubber permits a larger amount of the rubber to go into solution, resulting in a solution of a more resinous consistency, of greater body and increased tackiness. The addition of the small amount of colophony increases the tackiness and tends to aid in the dispersion of the rubber.

In use the sheets which are to be temporarily attached to a backing sheet are coated with the cement and pressed in position and may be easily removed and repositioned until the desired arrangement or effect desired is obtained.

After the temporarily attached sheets have been removed from the backing sheet or background, the cement adhering to the latter may be removed by lightly rubbing with the finger or with art gum eraser without leaving a stain or in any way damaging the background even where the most delicate water color or oil painting is used for the latter purpose.

The cement may be put up in air-tight cans or bottles, but when the latter is used the glass should be of amber color to guard against decomposition of the rubber constituent by the action of light.

I claim:

1. A cement comprising first quality pale depolymerized crepe rubber dissolved in substantially 70° Baumé gasoline, and colophony.

2. A cement comprising substantially 12% degradated crepe rubber, substantially 87.5% rubber solvent and substantially .5% colophony.

3. The process of making cement which comprises depolymerizing crude rubber through the action of heat and pressure, dissolving the so treated rubber in an oil distillate, adding colophony and churning the solution to a smooth consistency.

4. The process of making cement which comprises subjecting crude rubber to a temperature of substantially 330 degrees Fahrenheit at a pressure of substantially 90 pounds per square inch for a period of substantially 30 minutes, dissolving the so treated rubber in 70° Bé. gasoline and churning the solution to a smooth consistency.

5. The process of making cement which comprises subjecting crude rubber to a temperature of substantially 330 degrees Fahrenheit at a pressure of substantially 90 pounds per square inch for a period of substantially 30 minutes, dissolving the so treated rubber in 70° Bé. gasoline, adding a relatively small amount of resin and churning the solution to a smooth consistency.

In testimony whereof I have signed my name to the above specification.

LEON J. D. HEALY.